United States Patent [19]
Kurtz et al.

[11] Patent Number: 5,212,917
[45] Date of Patent: May 25, 1993

[54] BRICK EDGING DEVICE

[75] Inventors: Rubin Kurtz; David P. Karp, both of North York, Canada

[73] Assignee: Brickstop Corporation, North York, Canada

[21] Appl. No.: 812,467

[22] Filed: Dec. 23, 1991

[51] Int. Cl.⁵ .................................. A01G 1/00
[52] U.S. Cl. ............................ 52/102; 47/33; 404/7
[58] Field of Search ............ 52/102; 47/33, 32; 404/7, 8

[56] References Cited

U.S. PATENT DOCUMENTS

| | | |
|---|---|---|
| 3,559,338 | 2/1971 | Klingberg ........................ 47/33 |
| 3,676,952 | 7/1972 | Watts ............................. 47/33 |
| 4,831,776 | 5/1989 | Fritch . |
| 4,863,307 | 9/1989 | Jones . |
| 4,940,624 | 7/1990 | Horiki et al. . |
| 4,969,287 | 11/1990 | Trifiletti . |

FOREIGN PATENT DOCUMENTS 417724 of 1934 United Kingdom .............. 47/33

OTHER PUBLICATIONS

Brochure—"Kamb Raseneinfassung".

Primary Examiner—Richard E. Chilcot, Jr.
Assistant Examiner—Joanne C. Downs

[57] ABSTRACT

A brick edging device is disclosed for use as an interface or boundary of a bricked region In one aspect the edging device includes an elongate extruded aluminum strip extending in a longitudinal direction having a flange portion attached to an edge of the aluminum strip and extending in a transverse direction outwardly from one side of the strip. The flange is provided with a series of V-shaped cut-out portions spaced along the length thereof with the flat apex of the V being spaced from the edge of the elongate strip. The portion of the flange located between the cut-outs form individual flaps, each flap having an aperture extending therethrough to receive a spike. The apertures are countersunk so that the spike heads are flush with the flaps. There is an angle of at least 90 degrees between the sides of the V shaped cut-out portions and the aluminum strip is bendable at points adjacent to the apex to at least 90 degrees. Located on the other side of the strip is an integrally formed loop which can receive therein a planar stake. Stakes are provided having a hooked end portion opposite a sharp end, the hooked portion having a protrusion projecting inwardly into the hooked portion which is releasably snapped over the loop when the stake is inserted into the loop. Bricks may be laid onto the flap portions while the aluminum strip acts as a barrier between the bricked portion and other areas.

15 Claims, 4 Drawing Sheets

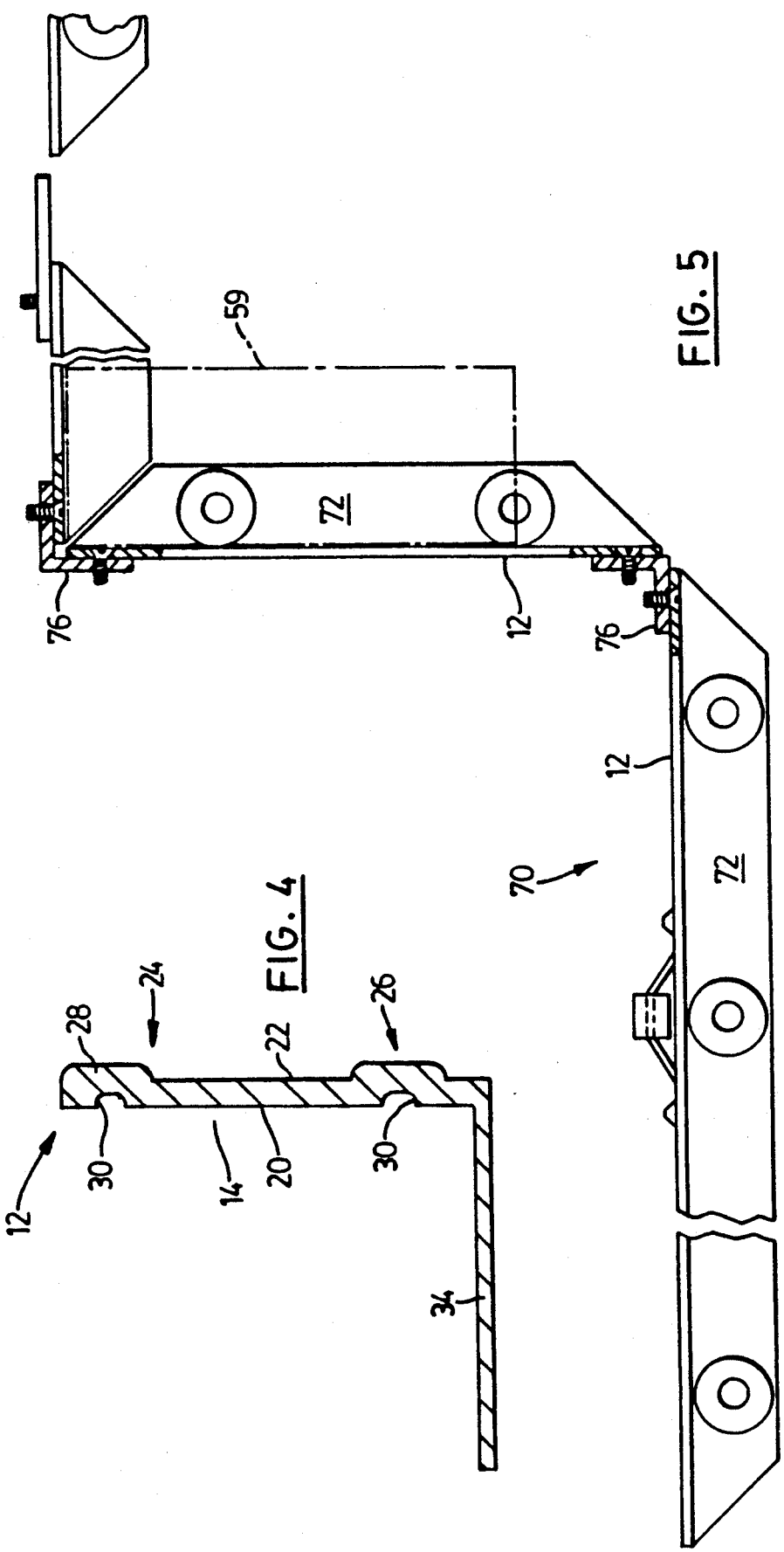

BRICK EDGING DEVICE

FIELD OF THE INVENTION

The present invention relates to brick edging devices.

BACKGROUND OF THE INVENTION

The need for brick edging devices to separate bricked areas from different kinds of terrain is well known. There are several basic types of brick edging devices utilized for a similar application, namely edging grassy areas. One type includes a single upright elongate strip with a horizontal flange member or a plurality of discrete individual flap members extending away from the elongate strip to provide support for the strip or an anchoring base for the device. However, edgers known in the prior art provided with these horizontal extending flanges or flaps have been designed so that the flange prevents bending of the strip or the flaps interfere with one another when the strip is bent, thereby limiting the angle to which the edger can be bent. Prior art edgers have also not been produced to accommodate standard size bricks when the strips are bent, but rely on the bricks being cut to provide a snug fit. Furthermore, in prior art edging devices, the horizontal flange or flaps or other means of support for the upright strip is commonly designed to remain uncovered by grass, brick or other substrate, thus producing a wide border between areas, comprising both the upright strip and the support means.

We have found that we can overcome these disadvantages in the prior art by providing a brick edging device that is provided with flaps that are configured and spaced to allow for bending of the strip to a variety of angles and can accommodate a brick of a standard size without the need for cutting of the brick to obtain a snug fit. In addition, our device, when in place, provides a sharp, well-defined boundary between the bordered areas.

Another type of prior art device in this class provides for the stabilization and securing of the elongate strip in an upright position using spikes or stakes with hooks at one end which hook over the upper edge of the strip. A drawback to this kind of arrangement is that during frost heaving the stake is driven up out of the ground and since the hook is securely interlocked with the strip, the strip is also dislodged from the ground. We have found that we can provide an improved snap fitting engagement between the stake and the edging strip so that, in the event of pressure due to heaving of the substrate, the hook will disengage from the strip rather than lift the strip from its position.

A single securing means is commonly inadequate to securely hold a strip in place at the boundary of a bricked region since there is considerable outward pressure acting on the bricks due to vehicles or people walking over the bricks. We have found that a dual means of securing the edging strip is preferable and have thus provided securing means both by way of a stake on one side of the strip and spike on the other side of the strip.

Connecting pieces joining lengths of brick edging are well known but have in the prior art, fixed the joined pieces in a manner prone to separation without accommodating changes in grade of the substrate on which the edger is fixed. Our connecting pieces overcome these disadvantages allowing for changes in grade. Also, many of the prior art devices are fabricated from plastics which are prone to splitting in cold weather or when struck during the installation step when driving spikes therethrough. Our device overcomes this disadvantage by being fabricated from materials resistant to splitting.

SUMMARY OF THE INVENTION

The subject invention provides a brick edging device for use as an interface or boundary between a bricked region and other types of terrain.

In one aspect of the invention a brick edging device includes an elongate strip extending in a longitudinal direction and having first and second opposed sides and opposed edges. A flange member is attached to the elongate strip along a first edge thereof and extends transversely from a first side of the elongate strip. The flange includes a plurality of spaced flap members and the flap members are each provided with an aperture for receiving a spike therein. There are a plurality of spaced, V-shaped cut-out portions separating adjacent flaps wherein the apex of the cut-out V portion is flat and is spaced from the first edge of the elongate strip. There is an angle of at least 90 degrees between the sides of the V so that the elongate strip can be bent at a position between the flat apex and said first angle to an angle of at least 90 degrees. Included is a plurality of spaced stake receiving means located on the second side of the elongate strip between the first and second edges.

In another aspect of the invention, the brick edge device includes an elongate strip extending in the longitudinal direction and which is provided with first and second opposed sides and opposed edges. There is provided a flange member which is attached to the elongate strip along a first edge of the elongate strip and which extends transversely from a first side of the elongate strip. The flange member is provided with a plurality of spaced apertures extending therethrough. The brick edge device includes a plurality of spaced stake receiving means located on a second side of the elongate strip. At least one stake means is provided which is receivable by the stake receiving means. The stake means includes a releasable gripping means which is engageable by the stake receiving means for forming an interlocking connection between the stake means and the stake receiving means.

BRIEF DESCRIPTION OF THE DRAWINGS

The brick edging device of the subject invention will now be described, by way of example only, with reference to the accompanying drawings, in which:

FIG. 4 is a sectional view taken along the lines 4—4 of FIG. 2; and

FIG. 5 is a perspective view of another embodiment of the brick edging device.

DETAILED DESCRIPTION OF THE PREFERRED AND ALTERNATIVE EMBODIMENTS

Figure 1:
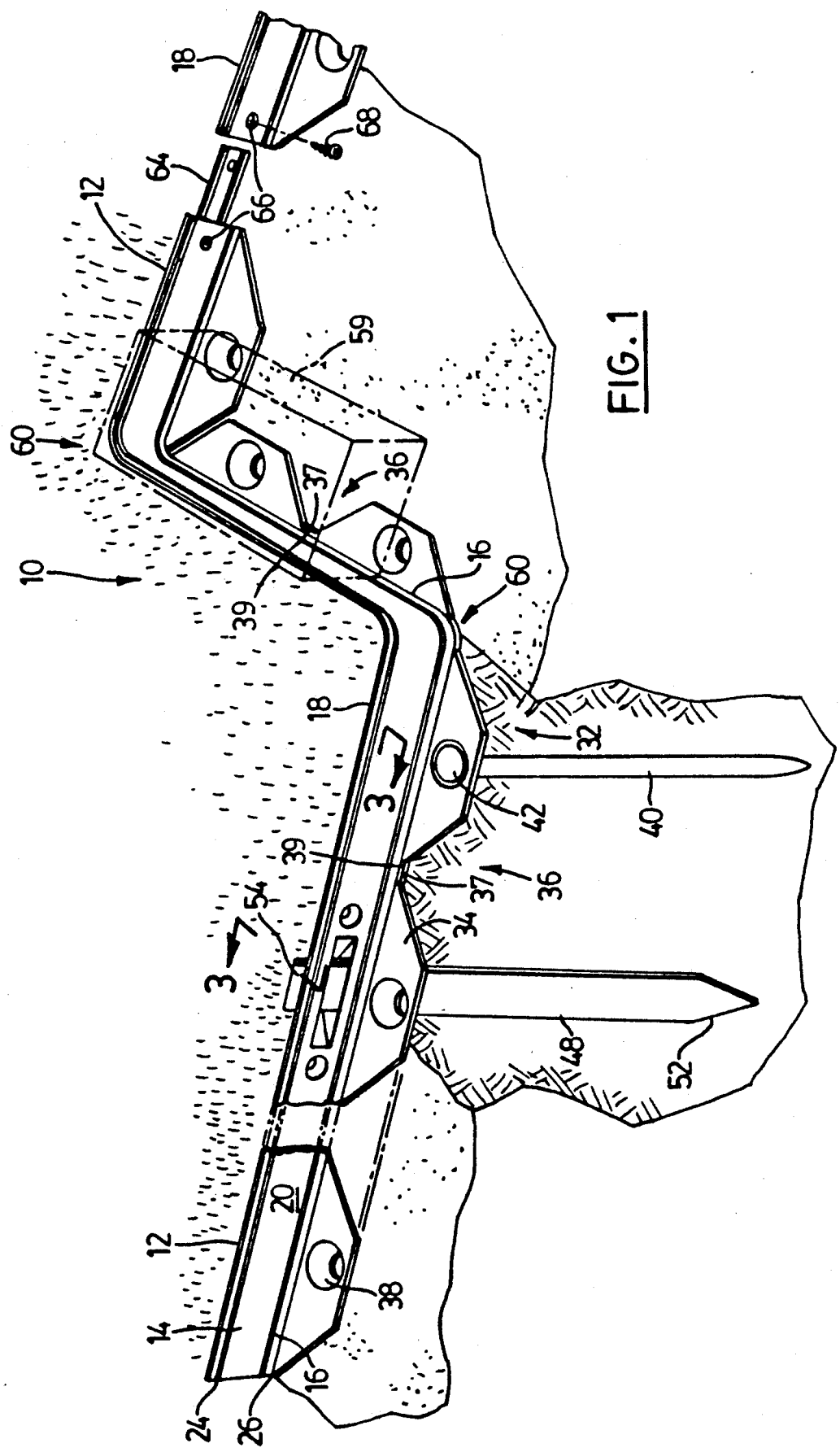
FIG. 1 is a perspective view of a first embodiment of the brick edging device embodying the subject invention.

In referring to the drawings like numerals refer to like parts. A first embodiment of a brick edging device 10 embodying the subject invention is shown in FIGS. 1-4 and includes an elongate strip portion 12 having a substantially planar portion 14, a first edge 16, a second opposed edge 18, and wherein planar portion 14 includes opposed sides 20 and 22. Elongate portion 12 includes spaced, longitudinal strengthening ribs 24 and 26 integrally formed therewith and extending along the full length of strip 12. Preferably ribbed portions include a rounded outer portion 28 and adjacent rounded channel portions 30, see FIG. 4. Ribs 24 and 26 mitigate against crimping of strip 12 during bending.

Figure 2:
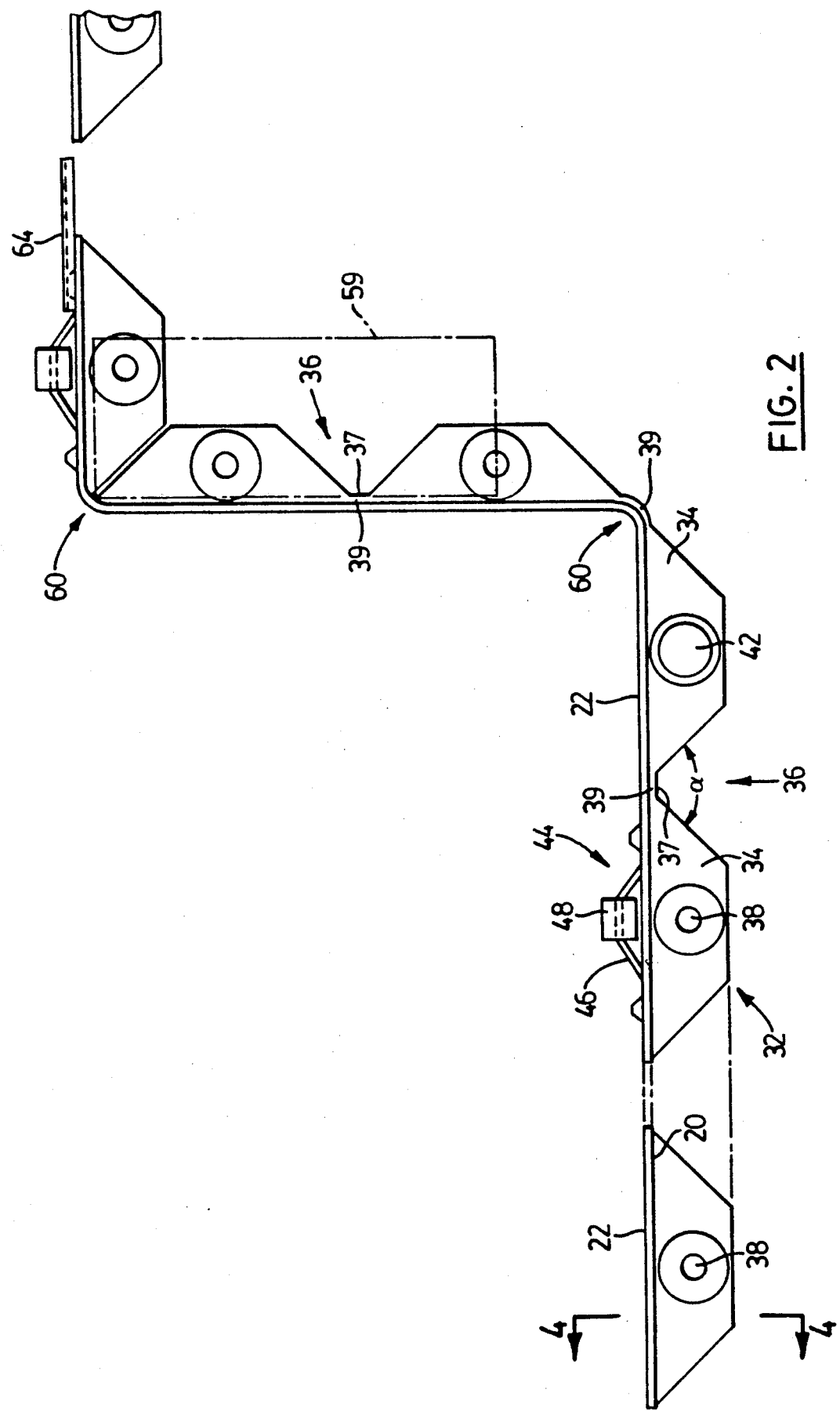
FIG. 2 is a top view of the device of FIG. 1.
Figure 3:
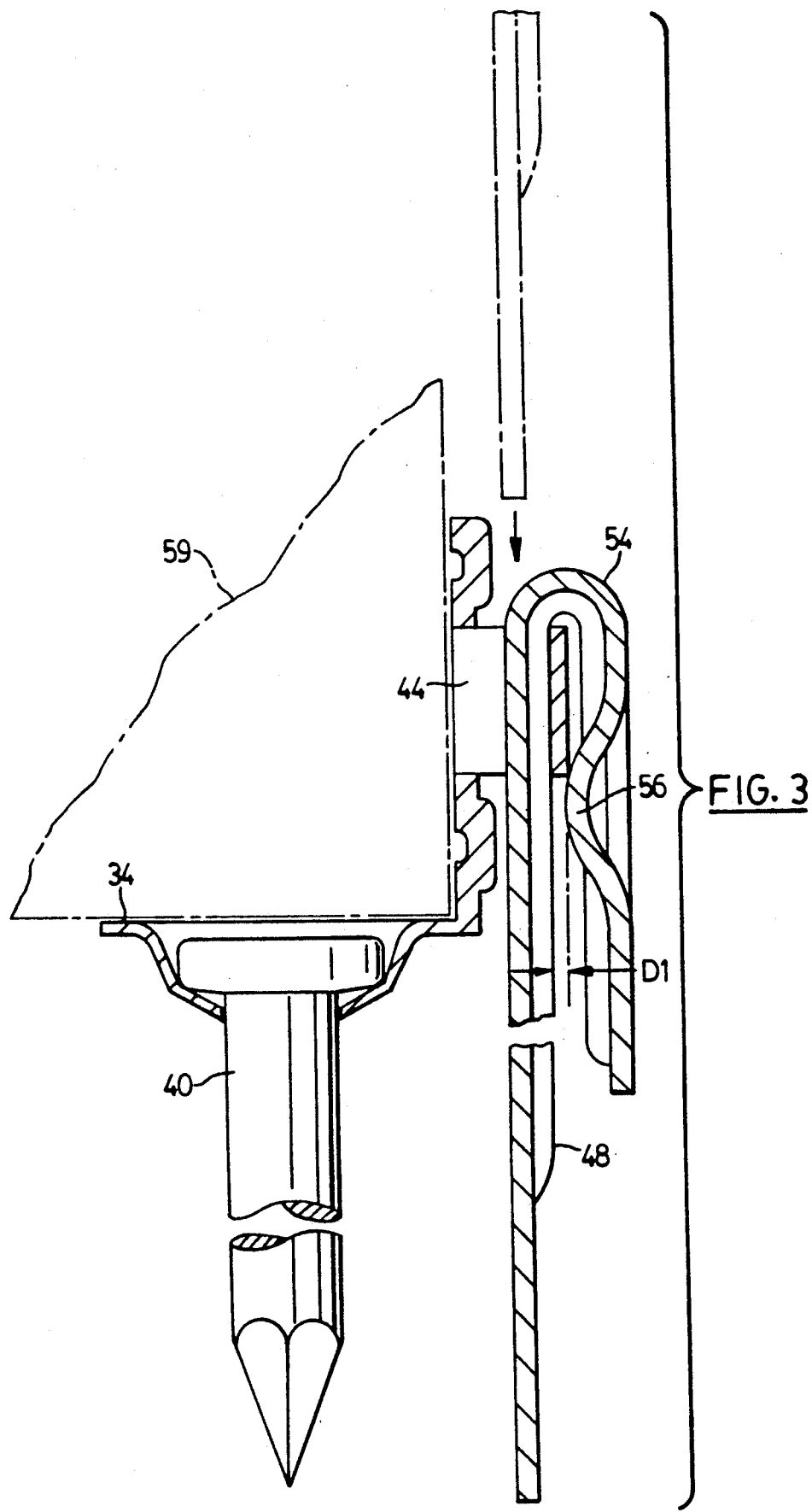
FIG. 3 is a sectional view of the brick edging device taken along the lines 3—3 of FIG. 1.

Brick edger 10 is provided with a substantially planar flange member 32 connected to strip portion 12 along edge 16 thereof. Flange 32 extends transversely with respect to planar portion 14 and away from side 20. Flange 32 includes a plurality of flap members 34 separated from each other by V-shaped cut-out portions shown generally at 36. An apex 37 of the cut-out V-shaped portions is flat, not pointed, wherein the flat apex portions 37 are parallel edge 16 and spaced about 0.08 to 1.0 mm from edge 16 defining a projecting portion 39. Strip 12 may be bent or shaped by bending strip 12, inwardly or outwardly with respect to flaps 32, at points adjacent flat apex portions 37 as illustrated in FIGS. 1 and 2. The presence of projecting portion 39 mitigates against tearing or ripping of strip 12 when the latter is being bent or shaped.

The size of the flap members 34 and spacing between the cut-out portions may be chosen to correspond to the width of a known standard size brick so that a single brick may be bordered by the strip embodying the subject invention, see FIGS. 1 and 2.

In one embodiment of the brick edger there is an angle of about 90 degrees between the sides of adjacent flap members 34 so that strip 12 may be bent inwardly by 90 degrees. It will be appreciated that in other embodiments angles of greater than 90 degrees between the sides of adjacent flaps may be formed, thus allowing for bending of the strip 12 to angles greater than 90 degrees.

Flaps 34 are each provided with an aperture 38 which may be countersunk. Apertures 38 are of a suitable size to receive therein a spike 40. With countersunk apertures 38, a head portion 42 of spike 40 will be flush with the top surface of flap 34 when a spike is located in an aperture.

Edger 10 includes a plurality of retaining loop members shown generally at 44 located on side 22 of strip 12 each of which extends outwardly therefrom. A wall portion 46 of loop 44 has a thickness of D1. A plurality of planar stake members 48 are each provided with a planar shaft portion 50 wherein loops 44 and stakes 48 are suitably dimensioned so that shaft 50 may be received through loop 44. Stake 48 is provided at one end with a sharpened end 52 adapted to be driven into the ground and a hooked portion 54 located at the other end thereof Hooked portion 54 is provided with an inwardly projecting protrusion 56 thereby forming a gap 58 between shaft 50 and protrusion 56. Gap 58 is of a width slightly smaller than D1 so that when stake 48 is received by loop 44 hook portion 54 snaps over wall 46 of loop 44 thereby fitting stake 48 in loop 44 with the upper end portion of hook 54 located below edge 18. In this way stake 48 and loop 44 form a snap fitting combination so that stake 46 is inhibited against moving with respect to strip 12 absent the application of significant pressure to release the snap fit.

The embodiment of the brick edger shown at 10 in FIGS. 1-4 is bendable along strip portion 10 along lines in the plane of planar portion 14 at a plurality of positions, examples of which are shown at 60. Since there is at least a 90 degree angle between the edges of adjacent flap members 34, strip 12 may be bent by up to at least 90 degrees, see FIGS. 1 and 2.

Brick edger 10 is preferably fabricated from extruded aluminum with ribs 24 and 26, flange 32, flaps 34 and retaining loops 44 being integrally formed therewith at the time of fabrication.

In one embodiment, several individual strips 12 may be collinearly coupled together using ribbed securing brackets such as those shown at 64 in FIGS. 1 and 2. Strip 12 includes countersunk holes 66 with the latter providing a recess in which the head of a screw 68 may reside in order that bricks may be placed snug against strip 12.

In operation, brick edger 10 is first shaped or bent as desired and then secured to the ground at the boundary of a region where bricks or concrete blocks are to be placed. To secure edger 10 in place, spikes 40 are driven through apertures 38 into the ground until spike head 42 is flush with the top surface of flap 34. Stakes 48 are inserted through retaining loops 44 until hooked end 54 grips loop wall 46 as previously disclosed to releasably lock stake 48 and strip 12 together. Bricks and the like may then be laid flush against strip 12 directly on top of flaps 34, as shown in ghost outline at 59 in FIGS. 1 and 2, rather than requiring a layer of sand or other spacing material.

Securing strip 12 on both sides thereof provides a more stable and secure brick edger so that strip portion 12 remains in the same position over time. When stake 48 is engaged in loop 44 strip 12 is inhibited from pivoting with respect to stake 48 in addition to which stake 46 acts to assist in maintaining strip 12 vertically upright at all times. Because stake 48 is releasably coupled to strip 12 it will snap free of strip 12, without being damaged, during frost heaving and the like, rather than both the strip and the stake being dislodged. Since the upper end of stake 48 is located below the upper edge of strip 12 the former will be rendered practically invisible when grass and bricks extend above upper edge 18 thereof.

FIG. 5 illustrates another embodiment of the brick edger at 70 comprising a plurality of short separate units 72 which may be attached to each other at 74 by brackets 76. Each unit 72 includes a flange 72 which is coextensive with strip 12, all other features being substantially the same as edger 10.

While the present invention has been described and illustrated with respect to the preferred and alternative embodiments, it will be appreciated that numerous variations of these embodiments may be made without departing from the scope of the invention, which is defined in the appended claims.

We claim:

1. A brick edging device, comprising:
   a) an elongate strip extending in a longitudinal direction and having first and second opposed sides and opposed edges;
   b) a flange member attached to the elongate strip along a first edge thereof and extending transversely from a first side of the elongate strip, the flange including a plurality of spaced flap member, said flap members each provided with an aperture for receiving a spike therein, a plurality of spaced, V-shaped cut-out portions separating adjacent flaps, wherein the apex of said cut-out V portion is flat and is spaced from the first edge of the elongate strip, there being an angle of at least 90 degrees between the sides of said V so that the elongate strip can be bent at a position between the flat apex and said first edge to an angle of at least 90 degrees; and c) a plurality of spaced stake receiving means located on the second side of the elongate strip between the first and second edges.

2. A brick edging device according to claim 1 wherein the apex of each V-shaped cut-out portion is spaced 100 mm from the apex of the adjacent V-shaped cut-out portion to accommodate the weight of a standard 100 mm ×200 mm brick on each flap member and the length of such a brick on two flap members.

3. A brick edging device according to claim 1 wherien the flap members are provided with countersunk apertures so that a top of a spike head of a spike located in said aperture is flush with a top surface of said flap member.

4. A brick edging device according to claim 1 wherein said stake receiving means comprises a loop integrally formed from and extending from said elongate strip.

5. A brick edging device according to claim 1 including at least one stake suitable to be driven into the ground, the stake including a releasable gripping means, the stake being receivable by said stake receiving means, the receiving means being engageable by said gripping means for forming a releasable connection between said stake and said stake receiving means.

6. A brick edging device comprising a plurality of discrete elongate strips as claimed in claim 1 wherein said edging device includes interconnection means for collinearly interconnecting said discrete members in the longitudinal direction.

7. A brick edging device according to claim 1 wherein said elongate strip is formed from extruded aluminum, said flanges and said receiving means being integrally formed therewith.

8. A brick edging device, comprising:
a) an elongate strip extending in a longitudinal direction and having first and second opposed sides and opposed edges;
b) a flange member attached to the elongate strip along a first edge thereof and extending transversely from a first side of the elongate strip, the flange member provided with a plurality of spaced apertures extending therethrough for receiving spikes therein;
c) a plurality of spaced stake receiving means located on the second side of the elongate strip between the first and second edges; and
d) at least one stake suitable to be driven into the ground, the stake including a releasable gripping means, the stake being receivable by said stake receiving means, the receiving means being engageable by said gripping means for forming a releasable connection between said stake and said stake receiving means.

9. A brick edging device according to claim 8 wherein the flange includes a plurality of spaced flap members, a plurality of spaced, V-shaped cut-out portions separating adjacent flaps, wherein the apex of said cut-out V portion is substantially flat and is spaced from the first edge of the elongate strip, there being an angle of at least 90 degrees between the sides of said V so that the elongate strip can be bent at a position adjacent the flat portion of the V-shaped apex by at least 90 degrees.

10. A brick edging device according to claim 9 wherein the apex of each V-shaped cut-out portion is spaced 100 mm from the adjacent V-shaped cut-out portion to accommodate the width of a standard 100 mm×200 mm brick on each flap member and the length of such a brick on two flap members.

11. A brick edging device according to claim 8 wherein said apertures are countersunk so that a top of a head of a spike located in said aperture is flush with a top surface of said flap member.

12. A brick edging device according to claim 8 including at least one spike adapted to be received by said aperture located in said flange member.

13. A brick edging device according to claim 8 wherein said stake receiving means comprises a loop integrally formed from and extending from said elongate strip.

14. A brick edging device according to claim 8 wherein said elongate strip is formed from extruded aluminum, said flanges and said receiving means being integrally formed therewith.

15. A brick edging device according to claim 8 comprising a plurality of elongate strips wherein said edging device includes interconnection means for collinearly interconnecting said discrete members in the longitudinal direction.

* * * * *

UNITED STATES PATENT AND TRADEMARK OFFICE
CERTIFICATE OF CORRECTION

PATENT NO. : 5,212,917
DATED : May 25, 1993
INVENTOR(S) : Rubin Kurtz and David P. Karp It is certified that error appears in the above-identified patent and that said Letters Patent is hereby corrected as shown below:

In the Claims:

Claim 2, column 5, line 12, after the words "accommodate the" delete "weight" and insert --width--

Signed and Sealed this

Eleventh Day of January, 1994

Attest:

BRUCE LEHMAN

Attesting Officer  Commissioner of Patents and Trademarks